(12) United States Patent
Chang

(10) Patent No.: US 8,764,479 B2
(45) Date of Patent: Jul. 1, 2014

(54) BATTERY CONNECTOR

(71) Applicant: Nai-Chien Chang, New Taipei (TW)

(72) Inventor: Nai-Chien Chang, New Taipei (TW)

( * ) Notice: Subject to any disclaimer, the term of this patent is extended or adjusted under 35 U.S.C. 154(b) by 74 days.

(21) Appl. No.: 13/674,942

(22) Filed: Nov. 12, 2012

(65) Prior Publication Data

US 2013/0143449 A1 Jun. 6, 2013

(30) Foreign Application Priority Data

Dec. 6, 2011 (TW) .............................. 100223020 U

(51) Int. Cl.
*H05K 5/00* (2006.01)
(52) U.S. Cl.
USPC .......................... 439/500; 439/79; 439/541.5
(58) Field of Classification Search
USPC ......................................... 439/500, 79, 541.5
See application file for complete search history.

(56) References Cited

U.S. PATENT DOCUMENTS

| | | | | |
|---|---|---|---|---|
| 5,528,460 | A * | 6/1996 | Byrd | 361/752 |
| 5,876,241 | A * | 3/1999 | Frantz | 439/500 |
| 6,068,235 | A * | 5/2000 | Gaffney et al. | 248/694 |
| 6,603,670 | B1 * | 8/2003 | Chien | 361/801 |
| 6,733,327 | B2 * | 5/2004 | Sugimoto et al. | 439/500 |
| 7,285,008 | B2 * | 10/2007 | Tsai | 439/500 |
| 7,591,672 | B2 * | 9/2009 | Wu | 439/500 |
| 8,067,109 | B2 * | 11/2011 | Zhang et al. | 429/100 |
| 2001/0002346 | A1 * | 5/2001 | Kodaira | 439/500 |
| 2002/0076956 | A1 * | 6/2002 | Yuzawa | 439/79 |
| 2004/0137786 | A1 * | 7/2004 | Yu | 439/500 |
| 2007/0015399 | A1 * | 1/2007 | Tsai | 439/500 |

* cited by examiner

*Primary Examiner* — Gary Paumen
(74) *Attorney, Agent, or Firm* — Chun-Ming Shih; HDLS IPR Services

(57) ABSTRACT

A battery connector is disclosed. The battery connector is disposed in a mounting side of a motherboard, and an input/output port is positioned on the mounting side for inserting outer connectors. Wherein, the electric connector includes a connector body having a battery accommodating space for accommodating the battery. The connector body is located on the mounting side and the input/output port is positioned on the mounting side. The computer case has a slot near the input/output port, and the slot is disposed corresponding to the battery accommodating space.

13 Claims, 8 Drawing Sheets

BATTERY CONNECTOR

This application is based on and claims the benefit of Taiwan Application No. 100223020 filed Dec. 6, 2011 the entire disclosure of which is incorporated by reference herein.

BACKGROUND OF THE INVENTION

1. Field of the Invention

The present invention generally relates to a battery connector and, in particular to a battery connector.

2. Description of Related Art

A motherboard is a circuit board with many important components in a computer system. There are CPU (Central Processing Unit), BIOS (Basic Input/Output System), CMOS (Complementary Metal-Oxide Semiconductor), memories, circuits, USB (Universal Serial Bus), and various connectors on the motherboard. Wherein, the BIOS is a computer program comprising basic input/output functions, self-test functions, and a program for reading CMOS data etc.

To set the value of the BIOS for maintaining the content on the motherboard, a button cell battery is needed. In the situation of a host does not turn off the main power, the life of the battery could last a long time for the BIOS power consumption of the motherboard coming from the reservation microcurrent after shutdown. However, the power of the button cell battery will run out very soon if a host does not turn on for a long time. In this situation, the button cell battery must be replaced for restarting the host.

However, a button cell battery is usually installed in a battery connector on the motherboard. Because the battery connector is located at an inner side of the motherboard, the computer case must be removed firstly when the battery is replaced. After the battery replacement is finished, the computer case has to put back. As a result, the battery replacement is not very convenient.

In view of the above drawbacks, the Inventor proposes the present invention based on his expert knowledge and elaborate researches in order to solve the problems of related art.

SUMMARY OF THE INVENTION

Accordingly, an object of the present invention is to provide a battery connector, in which the battery replacement of the motherboard can be achieved easily without removing the computer case.

In order to achieve the object mentioned above, the present invention provides a battery connector and arranged on a motherboard of a computer case, a mounting side of a motherboard has an input/output port for inserting outer connectors. Wherein, the battery connector includes a connector body having a battery accommodating space for accommodating the battery. The connector body is located in the mounting side which the input/output port is positioned on the mounting side. The computer case has a slot near the input/output port, and the slot is disposed corresponding to the battery accommodating space.

Another object of the present invention is to provide a battery connector, in which a protection cover is moveably assembled to the connector body for covering the battery accommodating space. And a good electrical conductivity will be achieved between the battery and the battery connector.

A further object of the present invention is to provide a battery connector, in which at least one USB socket is arranged on the connector body for convenience in use.

Comparing to the related art, the battery connector of the present invention has the following effects. The battery connector is disposed in a mounting side of the motherboard which an input/output port is positioned on the mounting side, and a slot is disposed near the input/output port of the computer case. Wherein, the battery connector is located corresponding to the slot that users can replace the battery from the slot directly without removing the computer case. Besides, the battery connector of the present invention can provide with USB sockets for reducing the installation space of the battery connector.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

Figure 1:
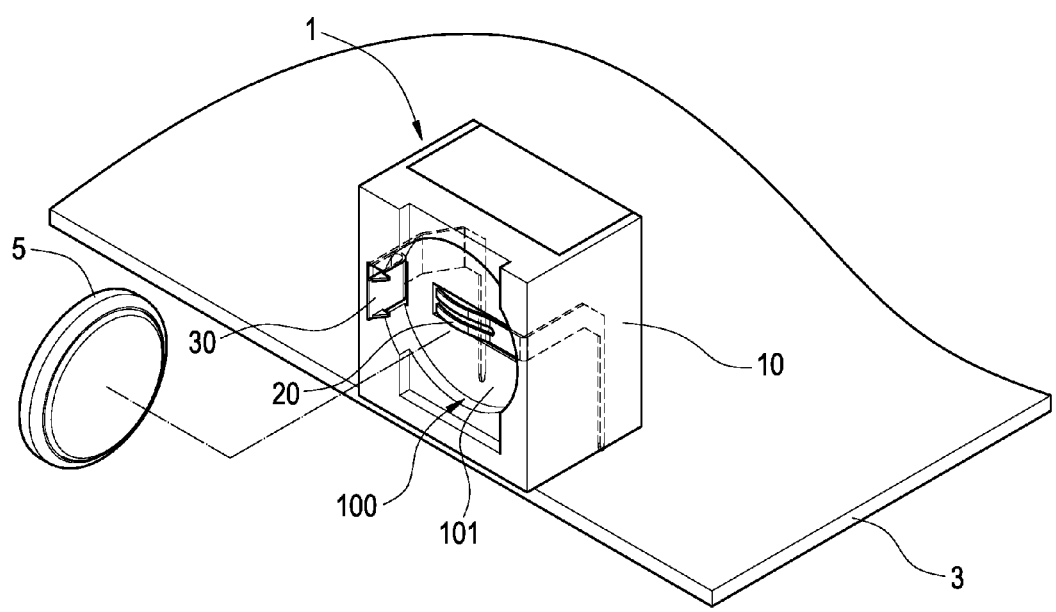
FIG. 1 is a perspective view according to the present invention.
Figure 2:
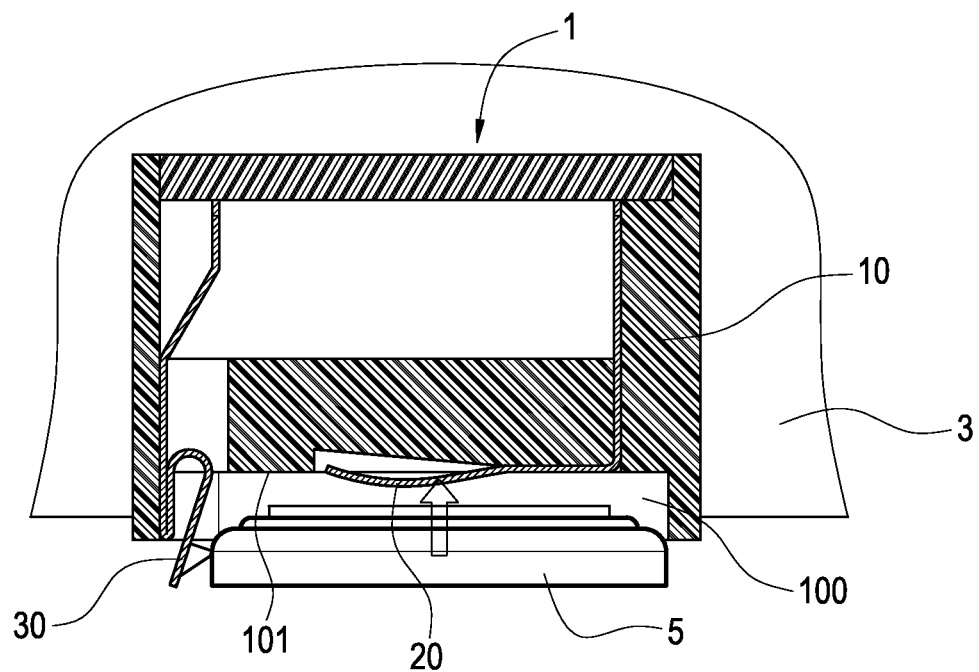
FIG. 2 is a schematic view of battery placement of the present invention.
Figure 3:
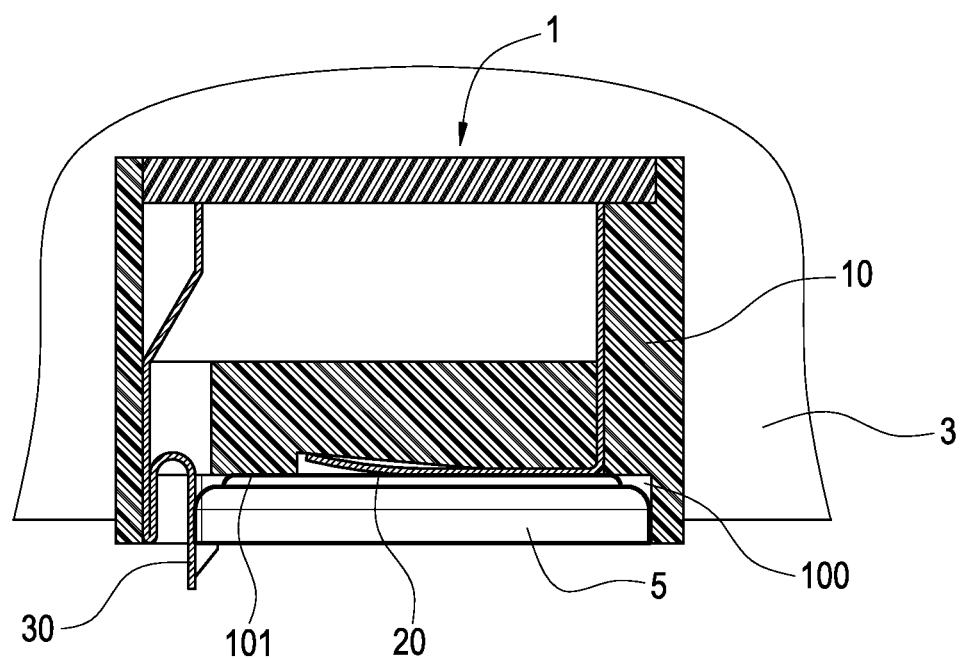
FIG. 3 is a schematic view after battery placement of the present invention.
Figure 4:
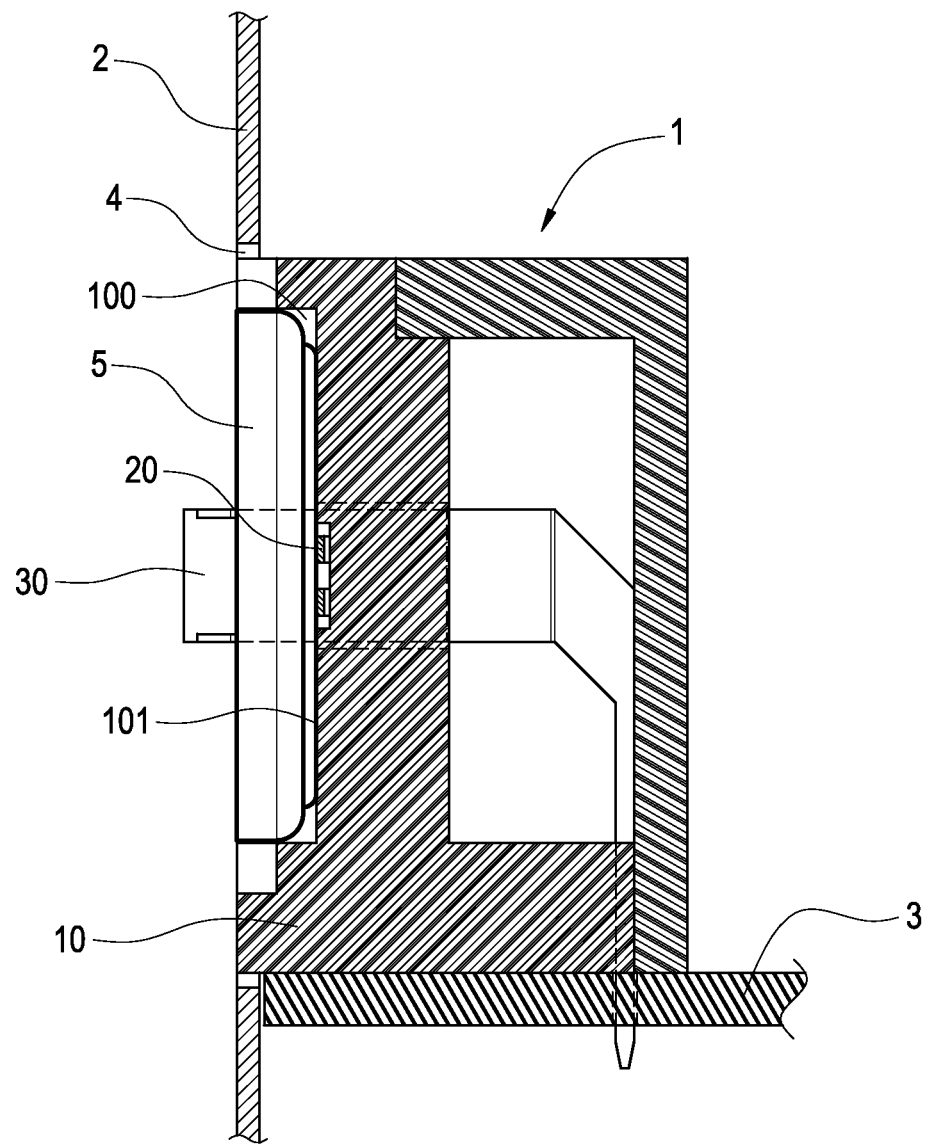
FIG. 4 is a cross sectional view of the battery connector assembled in the computer case.

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Please refer to FIG. 1 to FIG. 4, depict a perspective view of the present invention, a schematic view of battery replacement, a schematic view after battery replacement, and a cross sectional view of the computer case.

The present invention provides a battery connector 1 facilitating battery replacement disposed on a motherboard 3 inside a computer case 2. A mounting side of the motherboard 3 has an input/output port (not shown) on the mounting side for inserting outer connectors. The computer case 2 has a slot 4 near the input/output port correspondingly.

The battery connector 1 includes a connector body 10, a first electrode terminal 20, and a second electrode terminal 30 with respect to the first electrode terminal 20. The connector body 10 has a battery accommodating space 100 for accommodating a battery 5. The connector body 10 is located in a mounting side which the input/output port is positioned on the mounting side. The first electrode terminal 20 and the second electrode terminal 30 are electrically connected to the motherboard 3, and the slot 4 is disposed corresponding to the battery accommodating space 100.

In a preferred embodiment, the connector body 10 is disposed perpendicularity. A bottom face 101 of the battery accommodating space 100 is oriented to an outward direction of the slot 4. The first electrode terminal 20 is placed on bottom of the battery accommodating space 100, and the second electrode terminal 20 is placed on top of the battery accommodating space 100. Moreover, the first electrode terminal 20 is an elastic spring, and the second electrode terminal 30 is an elastic hook.

When the motherboard 3 is fixed inside of the computer case 2, the battery connector 1 will be positioned corresponding to the slot 4. Because the bottom face 101 of the battery accommodating space 100 is oriented to the outward direction of the slot 4, users can replace the battery 5 directly from the slot 4 (usually in the back side of the computer case) of the computer case 2.

After the battery 5 is disposed in the battery accommodating space 100, the battery 5 will electrically connect with the first electrode terminal 20 and the second electrode terminal 30. The battery 5 also electrically connects the motherboard 3 through the first electrode terminal 20 and the second electrode terminal 30. Whereby, the battery 5 provides the power for the BIOS of the motherboard 3.

Figure 5:
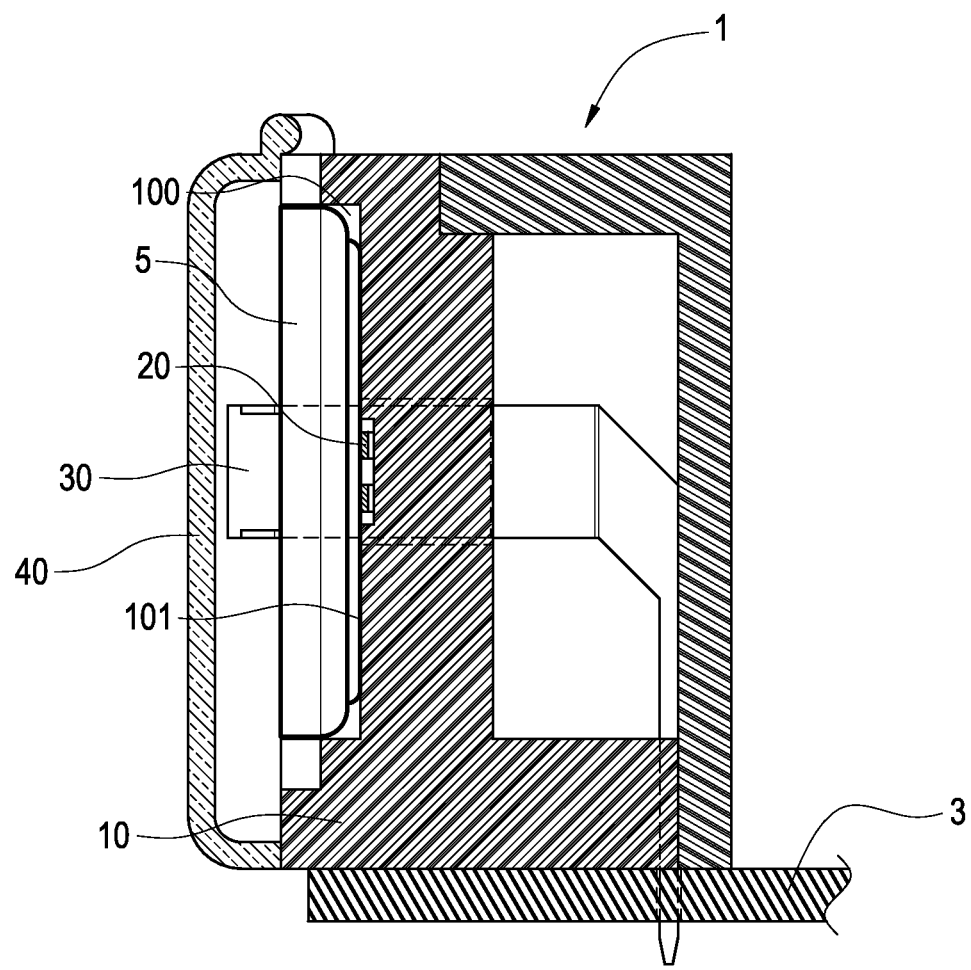
FIG. 5 is a schematic view of the batter connector with a protection cover of the present invention.

Please refer to the FIG. 5, depicts a schematic view of the battery connector with a protection cover. The battery connector 1 further includes a protection cover 40. The protection cover 40 is moveably assembled to the connector body 10 for covering the battery accommodating space 100 for a good electrical conductivity between the battery 5 and the battery connector 1.

Figure 6:
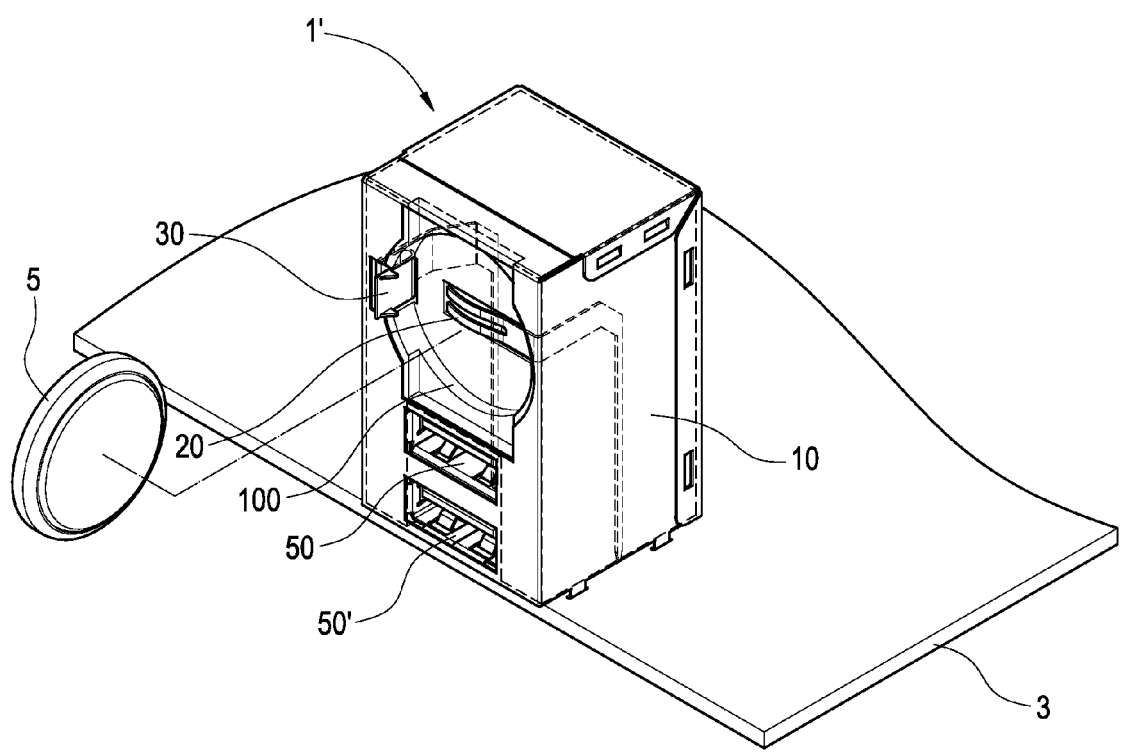
FIG. 6 is another application of the present invention.

With refers to FIG. 6, depicts another application of the present invention. In this embodiment, an battery connector 1' further includes at least one USB socket 50. The USB socket 50 is disposed on the connector body 10. In a preferred embodiment, the battery connector 1' comprises a plural of USB sockets 50,50'. Those USB sockets 50,50' are stacked under the battery accommodating space 100 and closed to the motherboard 3 for easy electrical conduction.

Figure 7:
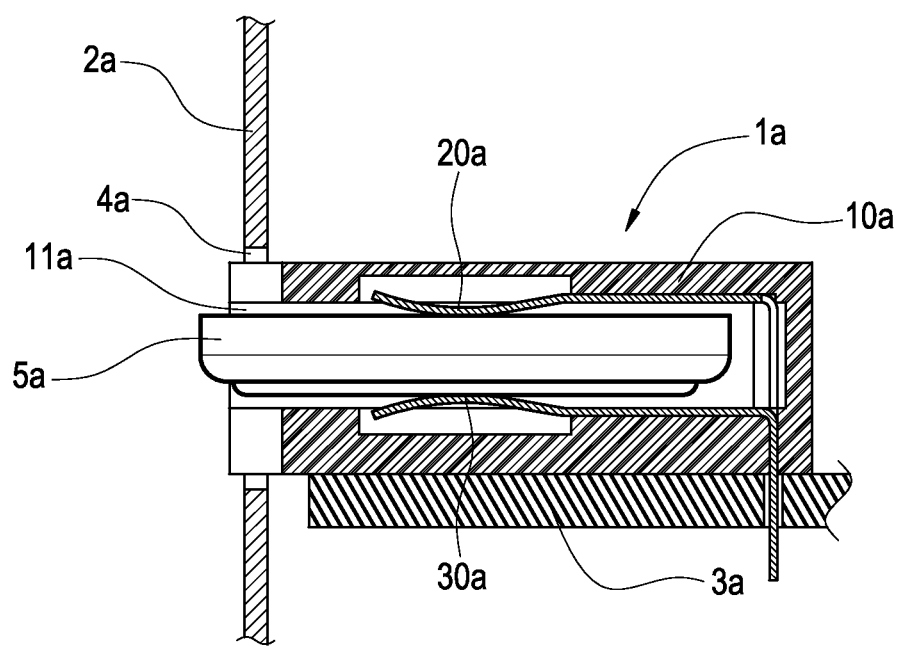
FIG. 7 is a cross sectional view of the second embodiment of the present invention.
Figure 8:
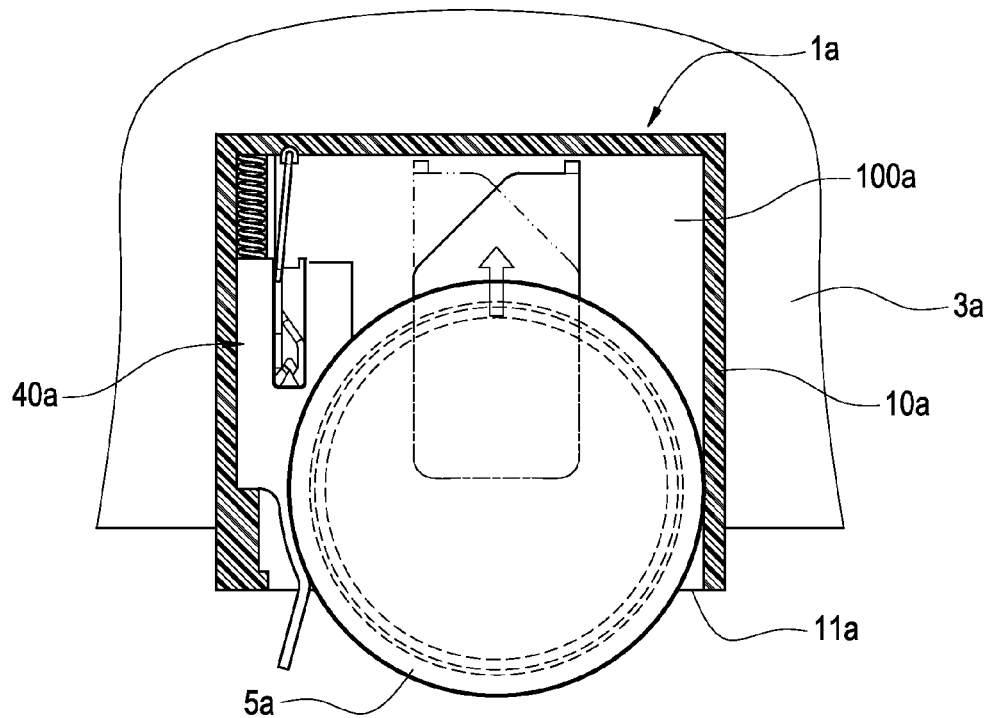
FIG. 8 is an application view of the second embodiment of the present invention.
Figure 9:
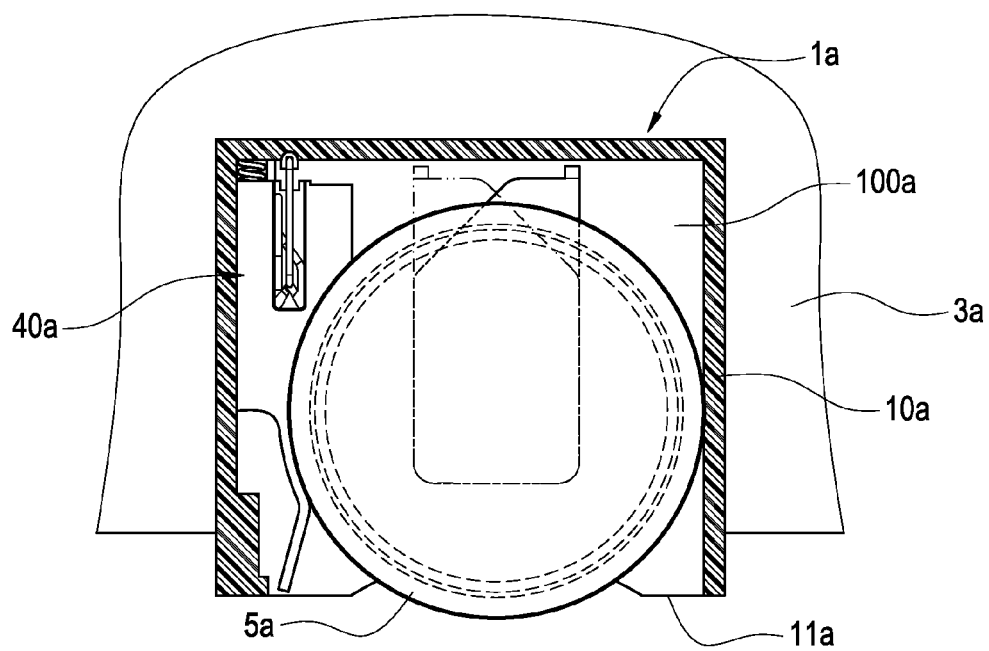
FIG. 9 is another application view of the second embodiment of the present invention.

As shown in FIG. 7 to FIG. 9, depict a cross sectional views of a second embodiment assembled in a computer case of the present invention. The present embodiment is substantially the same as the first embodiment. A battery connector 1a includes a connector body 10a, a first electrode terminal 20a and a second electrode terminal 30a. The connector body 10a has a battery accommodating space 100a for accommodating a battery 5a. The connector body 10a is located in a side, which the side input/output port is positioned on the motherboard 3a.

The second embodiment differs from the first embodiment in that the connector body 10a of the batter connector 1a has a socket 11a communicating with the battery accommodating space 100a. The insert direction of the socket 11a is directed to a slot 4a of the computer case 2a. The first electrode terminal 20a and the second electrode terminal 30a are located on opposite sides of the socket 11a. Furthermore, the connector body 10a is disposed horizontally, and the socket 11a is parallel to the motherboard 3a.

Moreover, in a preferred embodiment, the battery connector 1a further includes an elastic positioning structure 40a for pressing the battery 5a resiliently. The elastic positioning structure 40a is disposed inside the socket 11a and located in a side of the battery accommodating space 100a. After the battery 5a pushed in the battery accommodating space 100a, the elastic positioning structure 40a will press the battery 5a in position. On the other hand, the battery 5a is taken out when the battery is pushed inward. The battery 5a will depart from the press of the elastic positioning structure 40a and eject from the socket 11a.

Figure 10:
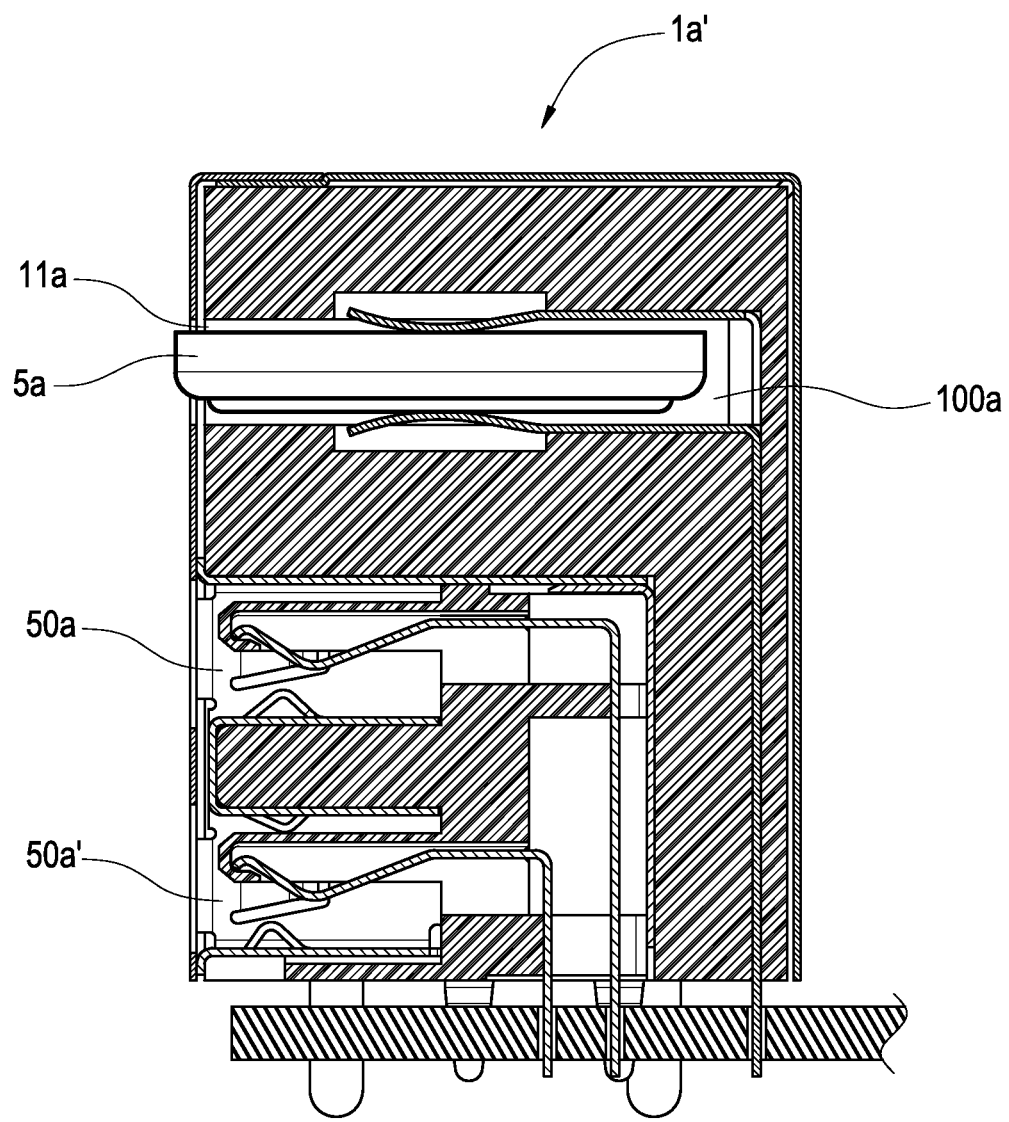
FIG. 10 is another configuration of the second embodiment of the present invention.

Please refer to FIG. 10, depicts another configuration of the second embodiment of the present invention. The present invention is substantially the same with first embodiment. The battery connector 1a of the second embodiment also includes at least one USB socket 50a. The USB socket 50a is arranged on the connector body 10a. In a preferred embodiment of the present invention, the battery connector 1a has a plural of USB sockets 50a, 50a'. Those USB sockets 50a, 50a' are stacked under the battery accommodating space 100a.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A battery connector arranged on a motherboard of a computer case, a mounting side of the motherboard having an input/output port for inserting outer connectors, characterized in that, the battery connector includes a connector body having a battery accommodating space for accommodating the battery, the connector body located on the mounting side of the motherboard and the input/output port positioned on the mounting side, the computer case having a slot near the input/output port, the slot disposed corresponding to the battery accommodating space.

2. The battery connector according to claim 1, further including a first electrode terminal and a second electrode terminal with respect to the first electrode terminal, wherein the first electrode terminal and the second electrode terminal are electrically connected with the motherboard.

3. The battery connector according to claim 2, wherein the connector body is disposed perpendicularly, and a bottom face of the battery accommodating space is oriented to an outward direction of the slot.

4. The battery connector according to claim 3, wherein the first electrode terminal is placed on the bottom of the battery accommodating space, and the second electrode terminal is placed on top of the battery accommodating space.

5. The battery connector according to claim 4, wherein the first electrode terminal is an elastic spring and the second electrode terminal is an elastic hook.

6. The battery connector according to claim 3, further including a protection cover, wherein the protection cover is moveably assembled to the connector body for covering the battery accommodating space.

7. The battery connector according to claim 2, wherein the connector body has a socket communicating with the battery accommodating space, and an insert direction of the socket is toward the slot.

8. The battery connector according to claim 7, wherein the connector body is disposed horizontally, the socket is parallel to the motherboard.

9. The battery connector according to claim 7, wherein the first electrode terminal and the second electrode terminal are located on opposite sides of the socket.

10. The battery connector according to claim 3, further including at least one USB socket, wherein the USB socket is arranged on the connector body.

11. The battery connector according to claim 10, wherein the USB socket is located under the battery accommodating space and close to the motherboard.

12. The battery connector according to claim 11, further including a plural of USB sockets, wherein the USB sockets are stacked under the battery accommodating space.

13. The battery connector according to claim 9, further including an elastic positioning structure for pressing the battery, wherein the elastic positioning structure is disposed inside the socket and located on a lateral side of the battery accommodating space.

* * * * *